United States Patent
Li et al.

(10) Patent No.: US 8,259,472 B2
(45) Date of Patent: Sep. 4, 2012

(54) SWITCHING POWER CONVERTER HAVING OPTIMAL DYNAMIC LOAD RESPONSE WITH ULTRA-LOW NO LOAD POWER CONSUMPTION

(75) Inventors: Yong Li, San Jose, CA (US); Fuqiang Shi, Cupertino, CA (US); Xiaolin Gao, Santa Clara, CA (US); David Nguyen, Santa Clara, CA (US)

(73) Assignee: iWatt Inc., Campbell, CA (US)

( * ) Notice: Subject to any disclaimer, the term of this patent is extended or adjusted under 35 U.S.C. 154(b) by 0 days.

(21) Appl. No.: 13/086,290

(22) Filed: Apr. 13, 2011

(65) Prior Publication Data

US 2012/0176820 A1 Jul. 12, 2012

Related U.S. Application Data

(60) Provisional application No. 61/430,904, filed on Jan. 7, 2011.

(51) Int. Cl.
*H02M 3/335* (2006.01)
*H02M 3/338* (2006.01)

(52) U.S. Cl. ............... 363/21.12; 363/21.13; 363/46; 363/75

(58) Field of Classification Search .... 363/21.12–21.18, 363/45–49, 75, 76, 78
See application file for complete search history.

(56) References Cited

U.S. PATENT DOCUMENTS

| | | | | |
|---|---|---|---|---|
| 5,923,542 A * | 7/1999 | Sasaki et al. | | 363/16 |
| 7,394,669 B2 * | 7/2008 | Fahlenkamp et al. | | 363/21.15 |
| 7,492,619 B2 * | 2/2009 | Ye et al. | | 363/97 |
| 7,826,237 B2 * | 11/2010 | Zhang et al. | | 363/21.12 |
| 7,952,895 B2 * | 5/2011 | Matthews | | 363/21.15 |
| 7,995,359 B2 * | 8/2011 | Djenguerian et al. | | 363/21.12 |
| 2008/0225563 A1 * | 9/2008 | Seo | | 363/123 |
| 2009/0147547 A1 * | 6/2009 | Yamashita | | 363/21.16 |
| 2010/0164455 A1 * | 7/2010 | Li et al. | | 323/283 |

\* cited by examiner

*Primary Examiner* — Jeffrey Sterrett
*Assistant Examiner* — Nusrat Quddus
(74) *Attorney, Agent, or Firm* — Fenwick & West LLP (57) ABSTRACT

A switch controller is disclosed that adaptively controls the operating frequency of a switching power converter in order to improve one-time load response and repetitive dynamic load responses. During a transition from a high load to low load condition, the switch controller clamps the operating frequency of the switching power converter at an intermediate frequency for a period of time before allowing the operating frequency to return to a frequency associated with the low load condition. The clamped frequency is higher than the frequency associated with the low load condition thereby allowing improved response to a subsequent load change to a high load condition. Thus, the system improves dynamic load response without compromising no-load power consumption.

16 Claims, 10 Drawing Sheets

SWITCHING POWER CONVERTER HAVING OPTIMAL DYNAMIC LOAD RESPONSE WITH ULTRA-LOW NO LOAD POWER CONSUMPTION

CROSS-REFERENCE TO RELATED APPLICATION

This application claims priority under 35 U.S.C. §119(e) from co-pending U.S. Provisional Application No. 61/430,904, filed on Jan. 7, 2011, which is incorporated by reference herein in its entirety.

BACKGROUND

1. Field of the Invention

Embodiments disclosed herein relate generally to a power converter, and more specifically, to a power converter having a switch controller that adaptively sets the frequency of the switching cycles of the power converter for optimal dynamic load response (DLR).

2. Description of the Related Arts

Switching power converters typically require error circuitry that provides an "error" signal between the output voltage of the power converter and a reference voltage, in order to regulate the output voltage. The error circuitry provides an error signal indicative of a magnitude and polarity (positive or negative) of the output voltage relative to a reference voltage. The error signal allows the power converter to properly regulate the output voltage by increasing or decreasing the amount of power delivered to the output of the power converter in response to the error signal.

Conventional power converters typically generate an error signal by sensing the output voltage as an analog value and deriving the difference between the sensed output voltage and the reference voltage as an analog value. The difference between the sensed output voltage and the reference voltage is amplified to properly regulate the output voltage based on the amplified signal. Conventional power converters may also use an analog-to-digital converter (A/D converter) to generate the error signal depending upon the control scheme being used in the converters. Other conventional power converters may use analog error amplifiers to generate the error signal.

In many conventional isolated switching power converters, the output voltage is directly sensed on the secondary side of a transformer circuit and is compared to a reference voltage that is generally fixed to a chosen voltage. This allows the output voltage of the power converter to be regulated to a target level based on the comparison.

Alternatively, other conventional isolated switching power converters do not sense the output voltage directly. Rather, these converters sense only signals of the primary side of the transformer circuit of the switching power converter to detect the output voltage level. These primary-only signals are compared to a reference voltage fixed to a chosen voltage so that the output voltage of the power converter is regulated to a target level. These isolated switching power converters are commonly referred to as primary-only feedback converters.

For switching power converters which are used to provide regulated power to portable equipment, such as smart phones and laptop computers, there are three major working modes for the switching power converters: standby mode, charging mode, and operational mode.

The standby mode is when the switching power converter is coupled to the AC mains (i.e., the supply voltage) but is disconnected from the electronic device. Thus, the switching power converter is operating in a low load condition (i.e., no load). During standby mode, the switching power converter must maintain output voltage regulation under the no load condition. Furthermore, the switching power converter is required to minimize internal power consumption in order to meet mandated environmental standards. For example, according to the 5-star energy standard, the maximum allowable standby power consumption for a cell phone charger is typically 30 mW under 230 Vac input voltage.

Pulse frequency modulation is an effective and often used method employed in the standby mode, where the operating frequency of the switching converter is reduced to a standby mode operating frequency in response to the no load condition. New trends in power consumption are requesting ultra-low standby power consumptions, such as less than 10 mW and even less than 5 mW, which require much lower no-load operating frequency to regulate the output voltage.

The charging mode is when the switching power converter is coupled to both the AC mains and the electronic device. Thus, the switching power converter is operating under a load condition. Here, the switching power converter provides regulated power to charge the internal battery of the electronic device without the electronic device being in active use. In this case, there is a one-time "low to high" dynamic load placed on the switching power converter at the time when the electronic device is initially connected to the switching power converter. In this situation, the switching power converter transitions from the standby mode to the charging mode. During the transition, the operating frequency is increased from the standby operating frequency to a higher frequency associated with the load condition. In response to the sudden increase in output load, there is an initial drop of the output voltage as well as overshoot ringing in the output voltage. The amount of output voltage drop and ringing is largely based on the output filter components and the speed of control loop. Once connected, the load placed on the switching power supply is mostly static and changes slowly as the battery charge state gradually increases.

Conversely, when the switching power converter transitions from the charging mode to the standby mode, there is a one-time "high to low" dynamic load placed on the switching power converter. When the high to low dynamic load is detected by the switch controller, the switching power converter is placed in the standby mode with the associated reduction in the switching frequency to the standby operating frequency that corresponds to the no load condition. In this case, there is an associated output voltage rise and overshoot ringing when the high to low dynamic load is placed on the converter.

Figure 1A:
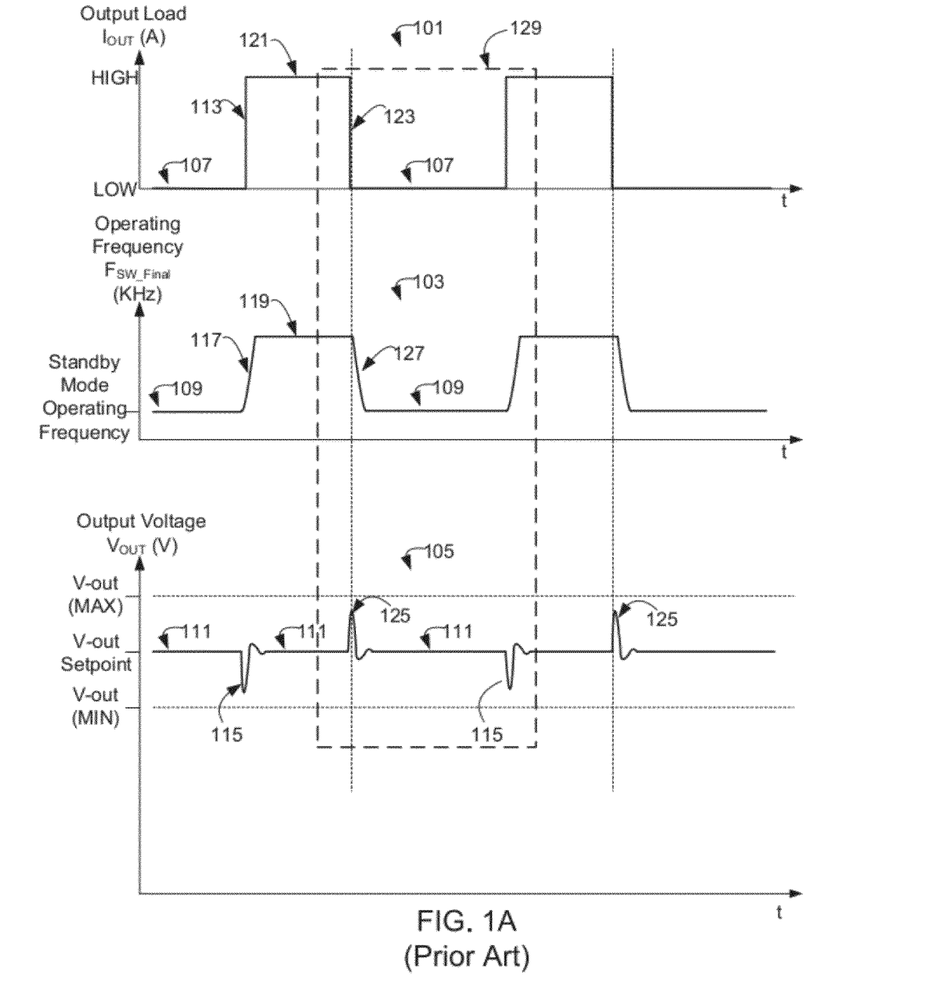
FIG. 1A illustrates waveforms of a conventional switching power converter during transitions between the standby mode and charging mode, or "one-time" dynamic load response.

FIG. 1A illustrates waveforms of a conventional switching power converter when transitioning between the standby mode and the charging mode and vice versa, which is otherwise known as a "one-time" dynamic load response. The one-time dynamic load condition references to a low frequency change of the output load, typically lower than 10 Hz. In particular, FIG. 1A illustrates the output load ($I_{OUT}$) waveform 101, operating frequency ($F_{SW\_FINAL}$) waveform 103, and the output voltage ($V_{OUT}$) waveform 105 of conventional switching power converters during the one-time dynamic load response.

For conventional switching power converters which employ primary-only feedback, the feedback signal representing the output voltage of the switching power converter is sensed at each switching cycle. Thus, a limitation to conventional primary-feedback-only switching power converters is that a switch controller of the converter can only respond to load changes switching cycle by switching cycle at the falling edge of the voltage feedback signal. The switch controller controls the operating frequency of the switching power converter upon detection of a change in the output voltage. A change in the output voltage indicates a change in output load. If the switching frequency is low (e.g., 300 Hz) such as in the low load condition, the switching period can be a long time period. This long period is otherwise known as the blank time or blind spot since the primary winding of the transformer does not have any sample information between two switching cycles while the switching power converter is operating and attempting to regulate the output voltage.

In FIG. 1A, the output load waveform 101 illustrates one period of the output load during the one-time "low to high" and "high to load" dynamic load. The output load waveform 101 cycles between a "low" load condition (i.e., no load) and a "high" load condition. The output voltage waveform 105 illustrates the transient response of the output voltage during the one-time dynamic load response. The switching power converter maintains the output voltage at the output voltage setpoint (V-out Setpoint) that represents the steady state output voltage of the converter, but can operate within a maximum allowable output voltage (V-out (MAX)) and a minimum allowable output voltage (V-out (MIN)). The operating frequency waveform 103 illustrates the switching frequency of the conventional switching power converter during the one-time dynamic load response.

When the output load is low 107, the conventional switching power converter is operating at the standby mode operating frequency (e.g., 300 Hz) 109 associated with the standby mode operation or low output load condition. During the low output load condition, the output voltage of the switching power converter is at the output voltage set point (V-out Setpoint). The low operating frequency during the low output load 107 makes the switch controller of the switching power converter less able to detect a rising edge of dynamic load.

In other words, the low operating frequency causes long blind spots representative of a long switching period. The long blind spot results in slow dynamic load response when the output load transitions 113 from a low load condition 107 to a high load condition 121. Depending on when the transition 113 from the low load 107 to high load condition 121 occurs in relationship to the blind spots, the output voltage drops (undershoots) 115 because the low operating frequency 109 of the converter prevents the converter from quickly responding to the load change.

Responsive to the output voltage undershoot 115 indicating a transition 113 to the high-output load condition 121, the switch controller increases 117 the operating frequency of the switching power converter to the high-output load operating frequency 119. The high-output load operating frequency 119 is the frequency in which the converter operates during a high-output load 121. Raising the operating frequency to the high-output load operating frequency 121 causes the output voltage to reach the steady state output voltage setpoint 111.

When the output load transitions 123 from a high-output load condition 121 to the low load condition 107, the output voltage rises (overshoots) 125. The rise in the output voltage 125 is detected by the switch controller and indicates a load change back to the low load state 107. The switch controller immediately responds by controlling the switching cycles to deliver reduced energy to the secondary load. Therefore, the switch controller lowers 127 the operating frequency to the standby mode operating frequency 109 in response to the sudden drop in the output load. By lowering the operating frequency to the standby mode operating frequency 109, the output voltage reaches the steady state output voltage setpoint 111.

Figure 1B:
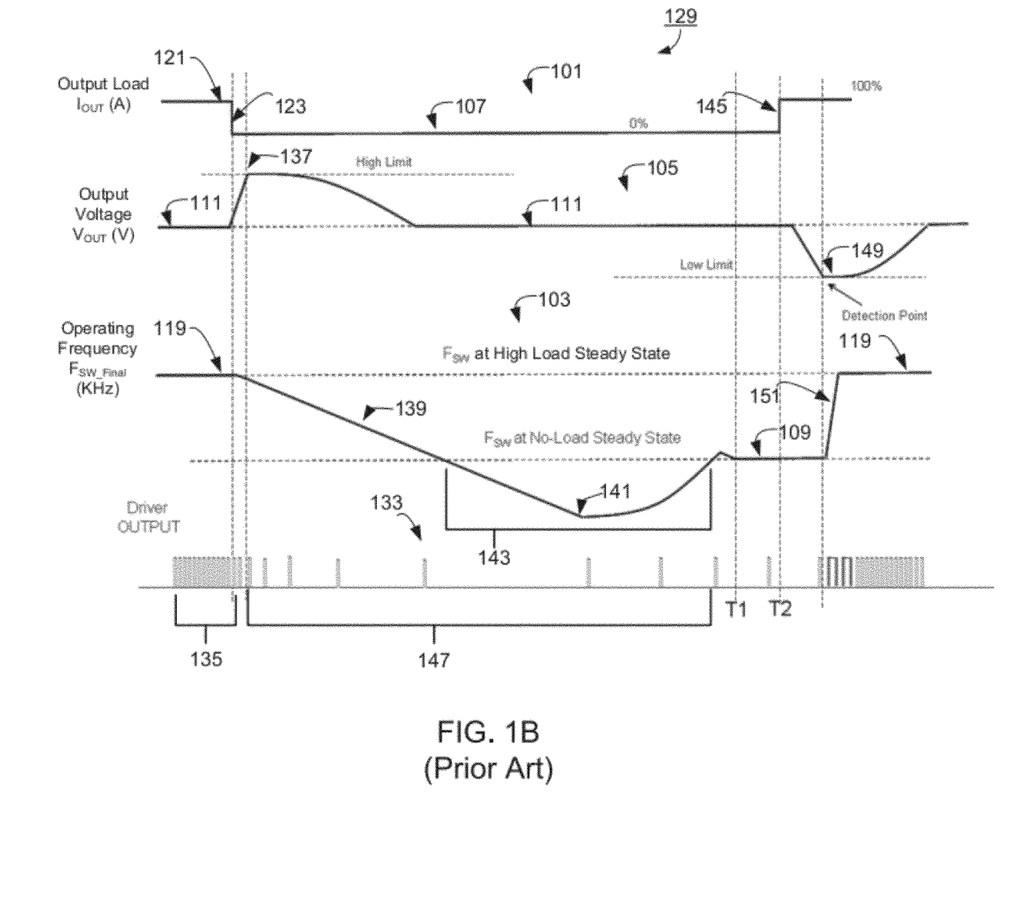
FIG. 1B illustrates a detailed view of the waveforms of the conventional switching power converter during the one-time dynamic load response.

FIG. 1B illustrates a detailed view of portion 129 of the waveforms in FIG. 1A during the transition 123 from the high load 121 to the low load 107 condition. In addition to the output load waveform 101, output voltage waveform 105, and operating frequency waveform 103 of the switching power converter, FIG. 1B illustrates the driver output waveform 133. The driver output waveform 133 illustrates the output drive signal of the switch converter. The output drive signal controls when a switch (e.g., metal-oxide-semiconductor field effect transistor) of the switching power converter is turned on or turned off.

As previously described, during the high output load 121, the output voltage is at the output voltage set point 111 and the switching power converter is operating at the high load operating frequency 119 ($F_{SW}$ at High Load Steady State). During the time period 135 when the converter is operating at the high load operating frequency 119, the output drive signal is outputted at a higher frequency compared to when the converter is operating at the standby mode operating frequency ($F_{SW}$ at No-Load Steady State) 109.

As shown in FIG. 1B, during the high load to low load transition 123, the output voltage rises (overshoots) to the high limit 137 which is higher than the output voltage set point 111 but below the maximum allowable output voltage. Upon detection of the overshoot voltage 137, the operating frequency ($F_{SW\_FINAL}$) is reduced 139 from the high-load operating frequency 119 and eventually settles to the standby mode operating frequency 109 associated with the low-load steady state condition 107. The standby mode operating frequency 109 during the low-load steady state condition 107 allows for ultra-low power consumption that is less than 30 mW or even less than 10 mW. However, due to the response characteristics of the conventional feedback control loop, the operating frequency drops below 141 the standby mode operating frequency 109 for a period of time 143 as shown in FIG. 1B. Note that the reduction of the operating frequency 139 is reflected in the driver output waveform 133. The output control signal is generated less frequently during the time period 147 where the operating frequency is being reduced 139.

The operating frequency eventually reaches the steady state standby mode operating frequency 109 at time T1. If the next low load to high load transition 145 occurs after T1 at time T2, the output voltage drops to the lower limit 149 which is above the minimum allowable output voltage of the converter. The switch controller detects the output voltage reaching the lower limit 149 (i.e., the detection point) of the dynamic load response requirement and accordingly increases 151 the operating frequency to the high load operating frequency 119. However, as will be discussed below, if the change in output load is repetitive, the low load to high load transition 145 may occur when the switching power converter is operating at a frequency 141 below the standby mode frequency 109, resulting in the output voltage undershoot exceeding the lower limit 149 of the dynamic load response requirement.

As discussed above, there are three major working modes for the switching power converters: standby mode, charging mode, and operational mode. The operational mode describes when the switching power converter is coupled to both the AC mains and the electronic device, and the electronic device is in active use. Here, the switching power converter provides regulated power to charge the internal battery of the electronic device and for the active use of the electronic device. In this case, there is a one-time "low to high" dynamic load placed on the switching power converter at the time when the electronic device is initially connected. However, because the electronic device is in active use, repetitive dynamic loads are placed on the switching power converter even after the one-time "low to high" dynamic load transition.

For example, LED elements are frequently used for backlighting of LCD displays commonly used in the electronic device. Pulse width modulation of the LED elements is typically used to provide dimming control. In this case, the LED elements are switched at frequencies typically in the 100 Hz to 200 Hz range. This switching causes a high frequency repetitive dynamic load on the switching power converter. When this occurs, conventional switch controllers are unable to determine if a dynamic load is either a one-time load or a repetitive dynamic load.

At each cycle of the repetitive dynamic load, the switch controller responds to the falling edge of the load by returning the switching power converter to the standby mode. When the subsequent rising edge of the load occurs, the switch controller in conventional switching power converters is thus operating at a lower operating frequency associated with the standby mode. Because of the lower operating frequency, the switch controller cannot quickly respond to the sudden increase in load.

Figure 2A:
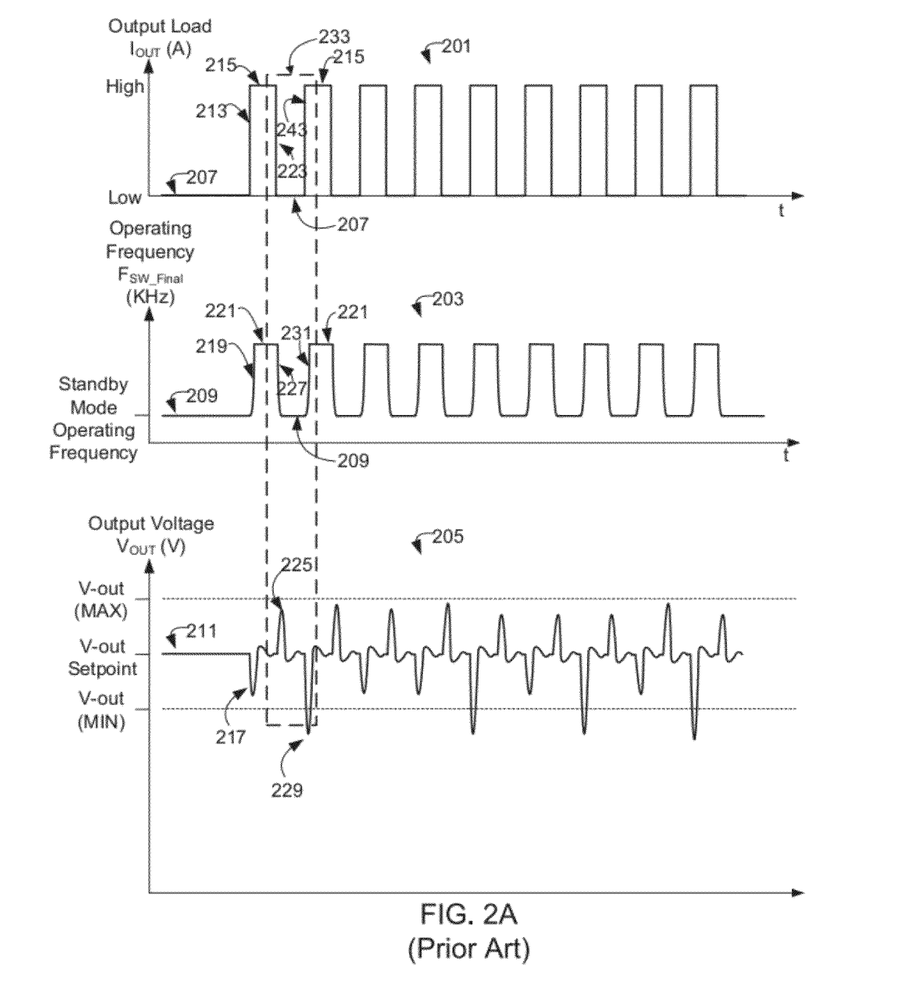
FIG. 2A illustrates waveforms of a conventional switching power converter during repetitive dynamic loads.

FIG. 2A illustrates waveforms of a conventional switching power converter during repetitive dynamic load changes. The repetitive dynamic load change describes a high frequency output load change from low-output load to high-output load and vice versa, typically higher than 100 Hz. FIG. 2A illustrates the output load ($I_{OUT}$) waveform 201, operating frequency ($F_{SW\_FINAL}$) waveform 203, and the output voltage ($V_{OUT}$) waveform 205 of the conventional switching power converter during repetitive dynamic load changes.

In FIG. 2A, the output load waveform 201 illustrates multiple periods of the output load during the repetitive dynamic load. The output voltage waveform 205 illustrates the transient response of the output voltage during the repetitive dynamic load response. Similar to FIG. 1A, the switching power converter attempts to maintain the output voltage at the output voltage setpoint (V-out Setpoint) but can operate within a maximum allowable output voltage (V-out (MAX)) and a minimum allowable output voltage (V-out (MIN)). The operating frequency waveform 203 illustrates the switching frequency of the conventional switching power converter during the repetitive dynamic load response.

When the output load is low 207, the switching power converter is operating at the standby mode operating frequency 209 associated with the low-output load. During the low output load condition, the output voltage of the switching power converter is at the output voltage set point (V-out Setpoint). During the transition 213 from the low-output load 207 to high-output load 215, the output voltage drops (undershoots) 217 since the converter is operating at the standby mode operating frequency 209 which prevents the converter from quickly responding to the load change.

Responsive to the output voltage undershoot 217, the switch controller increases 219 the operating frequency to the high-output load operating frequency 221. When the output load transitions 223 from a high-output load 215 to the low-output load 207, the output voltage rises (overshoots) 225. The rise 225 in the output voltage is detected by the switch controller and indicates a load change. The switch controller immediately responds by lowering 227 the operating frequency to the standby mode operating frequency 209 in response to the sudden drop in the output load.

During repetitive dynamic load conditions, such as the subsequent transition 243 from the low-output load 207 to high-output load 215, the output voltage $V_{OUT}$ will experience high output voltage transients during the rising and falling edge of the output load $I_{OUT}$ as shown in the output voltage waveform 205. Specifically and as will be explained in more detail below with reference to FIG. 2B, the output voltage $V_{OUT}$ experiences voltage undershoot 229 during the transition 243 from a low-output load 207 to high-output load 215 which exceeds the minimum allowable output voltage range (V-out (MIN)), thereby creating control loop instability issues and/or causing malfunction or even damage to the electronic load that is connected to the switching power converter.

Figure 2B:
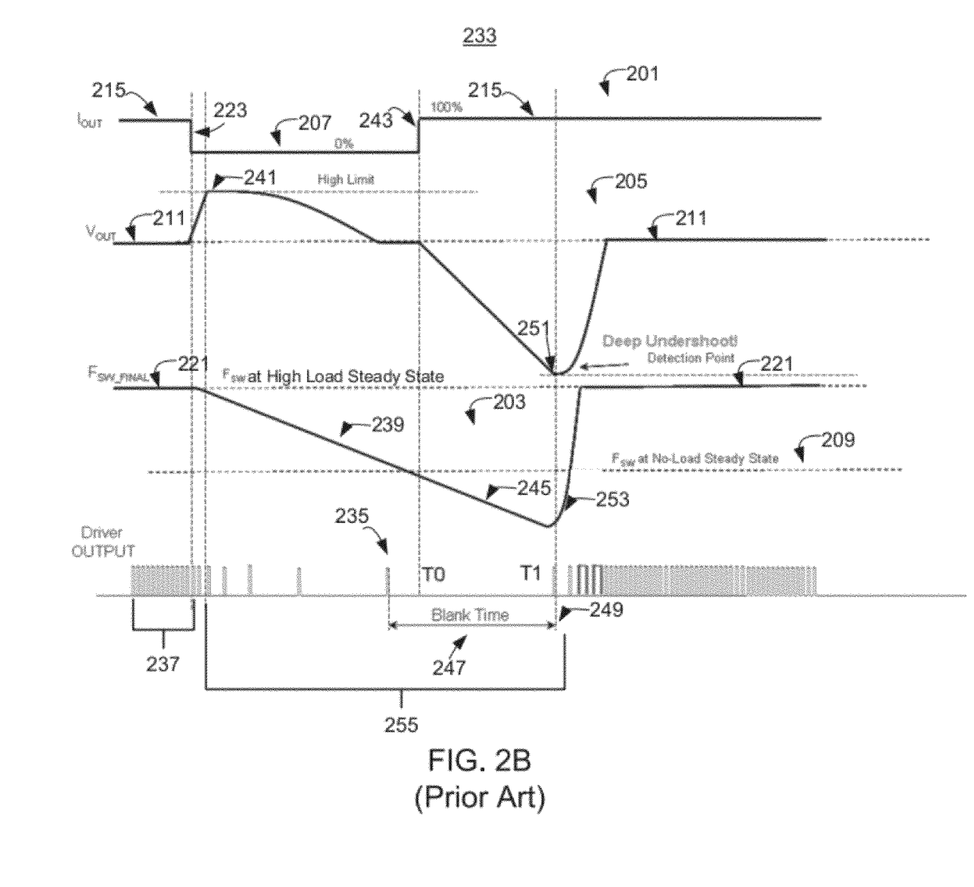
FIG. 2B illustrates a detailed view of the waveforms of the conventional switching power converter during repetitive dynamic loads.

FIG. 2B illustrates a detailed view of portion 233 of the waveforms in FIG. 2A during repetitive dynamic load changes. Similar to FIG. 1B, FIG. 2B also illustrates the driver output waveform 235 in addition to the output load waveform 201, output voltage waveform 205, and operating frequency waveform 203 of the switching power converter. During the high-output load 215, the output voltage $V_{OUT}$ is set to the output voltage setpoint 211 and the switching power converter is operating at the high load operating frequency 221 ($F_{SW}$ at High Load Steady State). During the time period 237 when the converter is operating at the high load operating frequency 221, driver output control signal is outputted at a higher frequency compared to when the converter is operating at the standby mode operating frequency ($F_{SW}$ at No-Load Steady State) 209.

After the transition 223 from the high-output load 215 to the low output load 207, the output voltage rises (overshoots) to the high limit 241 which is higher than the output voltage setpoint 211, but below the maximum allowable output voltage. Upon detection of the overshoot voltage 241, the operating frequency ($F_{SW\_FINAL}$) is reduced 239 to bring the output voltage to the steady state output voltage setpoint 211. During the reduction 239 of the operating frequency, the frequency falls below the steady state low-load operating frequency 209 between time periods T0 and T1. The reduction of the operating frequency 239 is reflected in the driver output waveform 235. The output control signal is generated less frequently during the time period 255 when the operating frequency is being reduced 239 compared to when the converter was operating at the high load operating frequency 221 during time period 237.

Because of the repetitive load changes, the subsequent transition 243 from low load 207 to high-load 215 occurs at time T0 when the operating frequency is below 245 the standby mode operating frequency 209 for the low load steady state due to the response characteristics of the conventional feedback control loop used in the converter. That is, the transition 243 occurs during the blank time 247. Because of the lower operating frequency, the blank time 247 is much longer because the primary-feedback-only switching power converter can only respond to the load changes switching-cycle-by-switching cycle. Thus, the next control loop response can only occur at the next switching cycle 249 which corresponds to the end of the blank time 247. Because of the long blank time, the output voltage $V_{OUT}$ experiences deep undershoot 251 until the end of the blank time 249 is reached at T1 where the operating frequency is increased 253 to the high load operating frequency 221 resulting in the output voltage reaching the output voltage set point 211. The deep undershoot 251 can result in malfunction and even damage to the electronic load that is connected to the switching power converter during the repetitive dynamic load condition since the switching power converter cannot respond to the voltage undershoot 251 until the next switching cycle of the driver output.

SUMMARY

A switching power converter is described which provides primary-only control of the switching cycles. To improve the response to the dynamic load situations, the switch controller clamps the operating frequency of the converter at an intermediate frequency when the output load transitions from a high load to a low load (i.e., no load) condition. The intermediate frequency is less than the operating frequency associated with the high load condition and greater than the operating frequency associated with the low load condition. Because the converter is operating at a higher frequency compared to the low load operating frequency associated with the low load condition, the converter can better respond to a dynamic load change from the low load condition back to the high load condition as typically seen in repetitive dynamic load situations. Upon the expiration of a timer, the operating frequency is reduced to the frequency associated with the low load condition if the output load is still in a low load state. Thus, the no-load power consumption of the converter is uncompromised. However, if the subsequent load transitions from low load to high load prior to the expiration of the timer, the operating frequency is increased to the high load frequency.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Embodiments disclosed herein describe a method of a switch controller for setting the operating frequency of a switching power converter during a "one-time" dynamic load response as well as "repetitive" dynamic load response. The operating frequency determines how soon an output load change can be sensed by the switch controller as well as the speed in which the switching power converter may react to the change. During an output load change from a high load condition to a low load condition, the switching power converter clamps or locks the operating frequency at an intermediate operating frequency. The clamped frequency is greater than the frequency which the converter would have operated at if the operating frequency was set based on the feedback signal of the converter. The higher operating frequency improves the power converter's load response while maintaining low power consumption since the operating frequency returns to an operating frequency associated with the low load condition after a period of time has expired.

Figure 3:
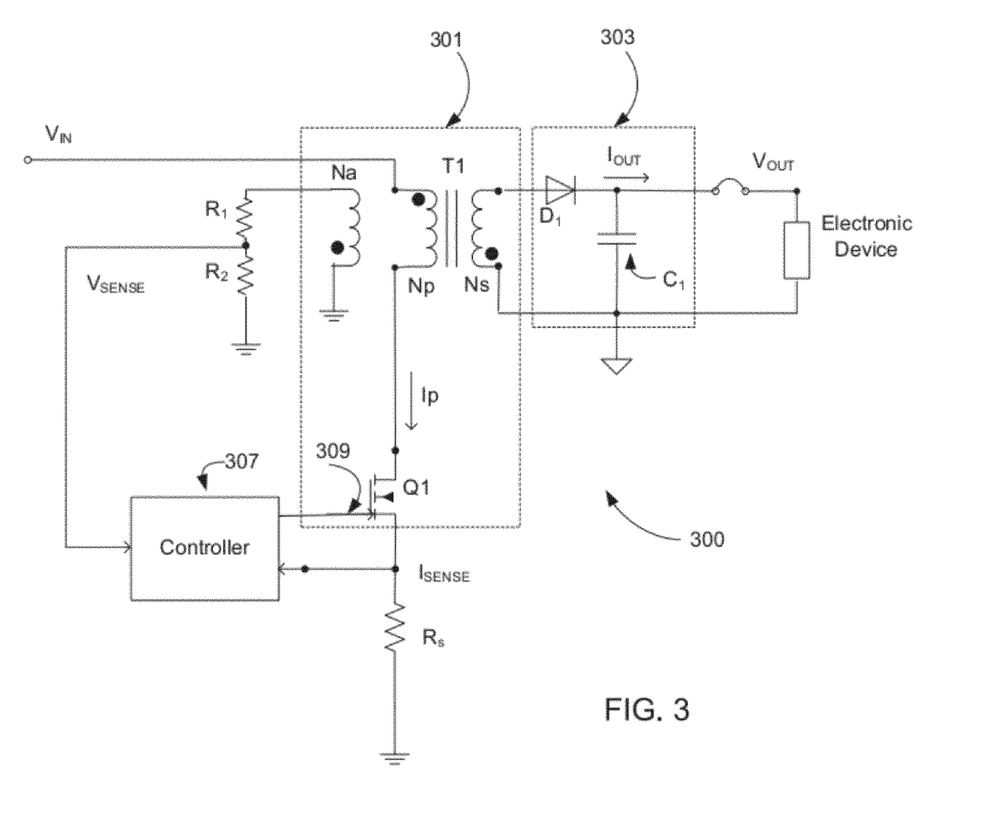
FIG. 3 illustrates a switching power converter with improved dynamic load response according to one embodiment.

FIG. 3 is a circuit diagram illustrating a flyback type switching power converter 300 according to one embodiment. The switching power converter 300 includes a power stage 301 and a secondary output stage 303. Power stage 301 includes a switch Q1 such as a power metal-oxide-semiconductor field-effect transistor (MOSFET) and a power transformer T1. Power transformer T1 includes primary winding Np, secondary winding Ns, and auxiliary winding Na. Secondary output stage 303 includes diode $D_1$ and output capacitor $C_1$. Controller 307 controls the ON state and the OFF state of switch Q1 using output drive signal 309 in the form of a pulse with on-times ($T_{ON}$) and off-times ($T_{OFF}$). In other words, the controller 307 generates the output drive signal 309 that drives the switch Q1.

AC power is received from an AC power source (not shown) and is rectified to provide the unregulated input voltage $V_{IN}$. The input power is stored in transformer T1 while the switch Q1 is turned on, because the diode $D_1$ becomes reverse biased when the switch Q1 is turned on. The rectified input power is then transferred to an electronic device across the capacitor $C_1$ while the switch Q1 is turned off, because the diode $D_1$ becomes forward biased when the switch Q1 is turned off. Diode $D_1$ functions as an output rectifier and capacitor $C_1$ functions as an output filter. The resulting regulated output voltage $V_{OUT}$ is delivered to the electronic device.

As mentioned previously, the controller 307 generates appropriate switch drive pulses 309 to control the on-times and off-times of power switch Q1 and regulate the output voltage $V_{OUT}$. The controller 307 controls switch Q1 using a feedback loop based on the sensed output voltage $V_{SENSE}$ and the sensed primary side current Ip in previous switching cycles of the switching power converter, in a variety of operation modes including PWM (pulse width modulation) and/or PFM (pulse frequency modulation) modes. $I_{SENSE}$ is used to sense the primary current Ip through the primary winding Np and switch Q1 in the form of a voltage across sense resistor $R_S$.

The output voltage $V_{OUT}$ is reflected across auxiliary winding Na of transformer T1, which is input to controller 307 as the voltage $V_{SENSE}$ via a resistive voltage divider comprised of resistors $R_1$ and $R_2$. Based on the sensed output voltage, the controller 307 determines the operating frequency of the switching power converter 300 which dictates the frequency of the on-times ($T_{ON}$) and off-times ($T_{OFF}$) in the output drive signal 309.

One-Time Dynamic Load Transition

Figure 4A:
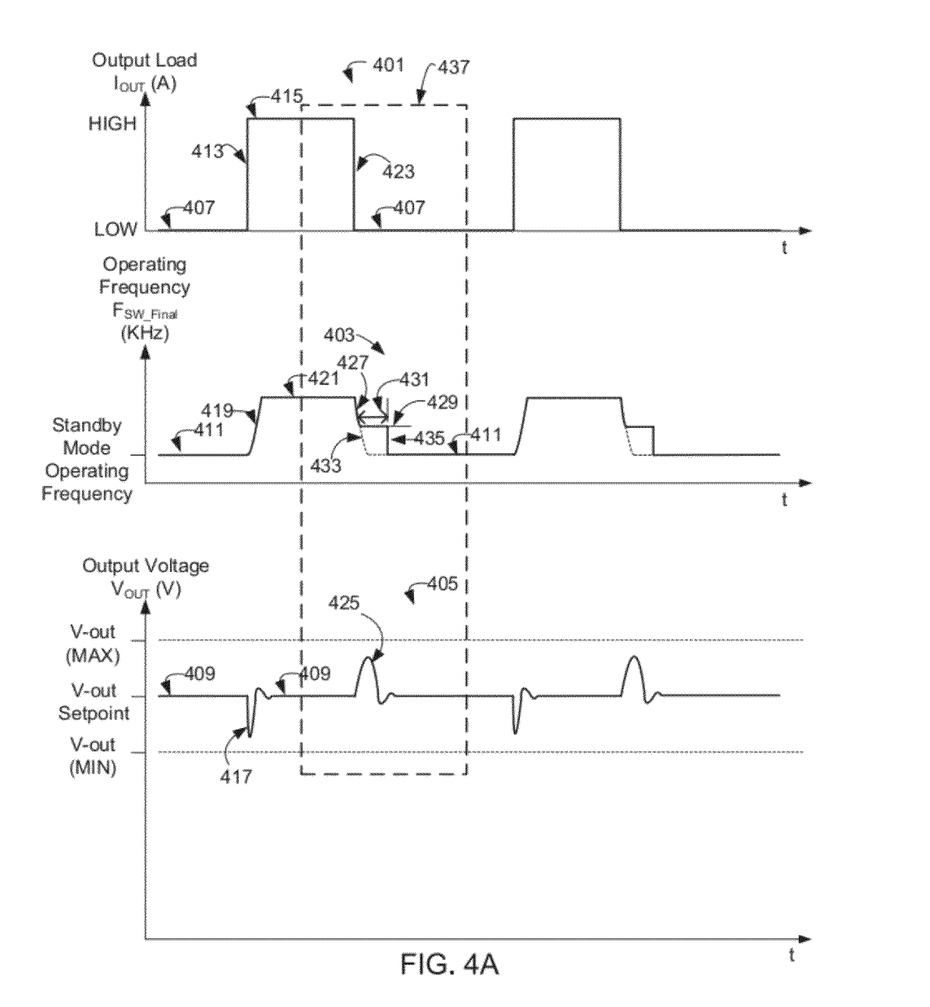
FIG. 4A illustrates waveforms of the switching power converter when the switching power converter transitions between the standby mode and charging mode, or "one-time" dynamic load response, according to one embodiment.

FIG. 4A illustrates waveforms of the converter 300 during a one-time dynamic output load transition. The waveforms include the output load ($I_{OUT}$) waveform 401, switching power converter operating frequency ($F_{SW\_FINAL}$) waveform 403, and the output voltage ($V_{OUT}$) waveform 405 of the power converter 300 during the one-time dynamic output load transition. In one embodiment, a one-time dynamic load condition refers to low frequency change of the output load ($I_{OUT}$) from a low load to a high load condition and vice versa where the frequency is typically lower than 10 Hz.

The output load waveform 401 illustrates a dynamic load characteristic typically found in an electronic device's transition from standby mode to a charging mode and vice versa. Particularly, the output load waveform 401 depicts the output load cycling from a low load state 407 to a high load state 415 and vice versa. The output voltage waveform 405 illustrates the transient response of the output voltage during the one-time dynamic load response. The switching power converter 300 operates at a steady state output voltage setpoint (V-out Setpoint) that may fluctuate within a maximum allowable output voltage (V-out (MAX)) and a minimum allowable output voltage (V-out (MIN)). The operating frequency waveform 403 illustrates the switching frequency of the switching power converter 300 during the one-time load response.

When the output load is low 407, the output voltage of the switching power converter 300 is at the output voltage set point (V-out Setpoint) 409. The output voltage set point 409 is the steady state output voltage of the converter 300. During the low load condition 407, the controller 307 sets the operating frequency of the converter 300 at the standby mode operating frequency 411.

As shown in FIG. 4A, during the transition 413 (i.e., the rising edge of the output load) from low load 407 to a high load 415 the output voltage waveform drops 417 (undershoots) to a value below the output voltage set point 409 before again reaching the steady state set point 409. The output voltage undershoot 417 indicates the transition 413 to the high load condition 415. In response to the output voltage undershoot 417, the controller 307 increases 419 the operating frequency from the standby mode operating frequency 411 to the high load operating frequency 421 associated with the high load condition 415. By increasing the operating frequency to the high load operating frequency 421, the output voltage is regulated back to the output voltage setpoint 409.

When the output load transitions 423 from the high load 415 to the low load 407, the output voltage overshoots 425. The voltage overshoot 425 causes the controller 307 to reduce 427 the operating frequency until an intermediate frequency 429 is reached. As shown in FIG. 4A, the operating frequency is clamped at the intermediate frequency 429 during a transition 423 from a high-output load 415 to low output load 407. By setting the operating frequency at the intermediate frequency 429, the controller 307 can respond quicker to any subsequent changes in the output load compared to when the operating frequency is calculated based on the value of Vsense. In one embodiment, the intermediate frequency 429 is lower than the high load operating frequency 421 and greater than the standby mode operating frequency 411 during the low output load condition. The intermediate frequency 429 is related to the power converter system design parameters. These design parameters include the standby mode operating frequency 411, the total system power consumption at the standby condition, the output capacitor C1, the length of the timer during which the actual operating frequency is clamped at the intermediate frequency 429, the maximum allowable output voltage overshoot, etc. In one embodiment, the intermediate frequency 429 is set in the range of 3 to 8 times the standby mode operating frequency 411.

In one embodiment, the switch controller 307 sets an override period 431 during the transition 423 from high load 415 to low dynamic load condition 407 when the operating frequency reaches the intermediate frequency 429. The override period 431 describes a time period in which the switch controller 307 overrides the operating frequency of the converter 300 calculated based on the value of the Vsense signal from the feedback control loop in response to the error of the feedback signal. The operating frequency that would have been set based on the value of Vsense is illustrated as dashed line 433.

Instead of setting the operating frequency of the switching power converter 300 based on Vsense during override period 431, the minimum operating frequency during the transition 423 from high load 415 to low load 407 (i.e., charging mode to standby mode) transition is clamped by the controller 307 at the intermediate frequency 429. During the override period 431, if the calculated operating frequency 433 based on the value of Vsense is higher than the intermediate frequency 429, the controller 307 sets the actual operating frequency of the switching converter 300 to the operating frequency based on the value of Vsense rather than clamping it to frequency 429.

However, if the operating frequency 433 calculated based on the value of Vsense is less than or equal to the intermediate frequency 429, the controller 307 clamps the actual operating frequency of the switching converter 300 to the intermediate frequency 429 during the duration of the override period 431. Once the override period 431 expires, the switch controller 307 once again sets the operating frequency 433 based on the feedback signal Vsense. For example, once the override period 431 expires, the controller 307 reduces 435 the operating frequency to the standby mode operating frequency 411.

Figure 4B:
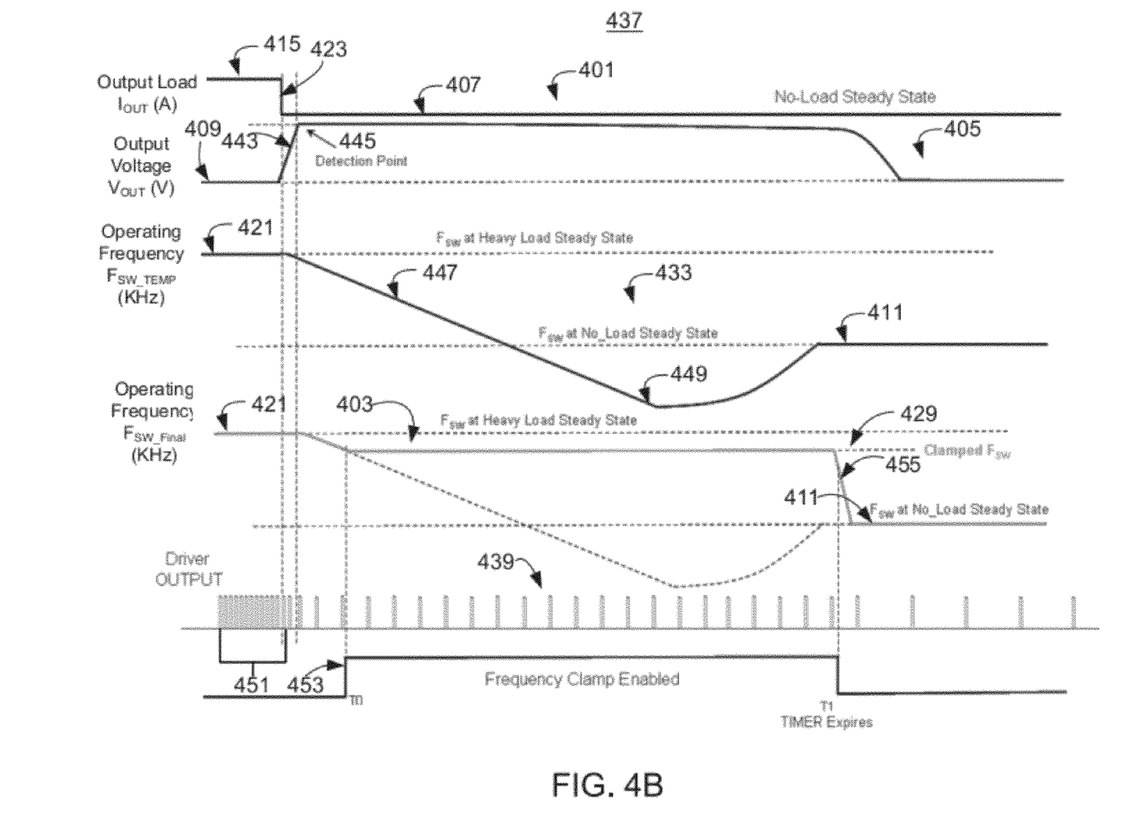
FIG. 4B illustrates a detailed view of the waveforms of the switching power converter during the one-time dynamic load response, according to one embodiment.

Turning to FIG. 4B, FIG. 4B illustrates a detailed view of portion 437 of the waveforms of the converter 300 in FIG. 4A during the transition 423 from the high load 415 to low output load 407 where the output load maintains the low-load steady state condition 407. In addition to the output load waveform 401, the actual operating frequency ($F_{SW\_FINAL}$) 403 of the converter 300, and output voltage waveform 405, FIG. 4B also illustrates the operating frequency ($F_{SW\_TEMP}$) waveform 433 calculated based on $V_{SENSE}$, the driver output waveform 439 representative of the output drive signal 309 of the controller 307, and a timer waveform 453 as will be further described below.

The output load waveform 401 illustrates the transition 423 from the high load 415 to low load condition 407. The transition 423 causes the output voltage to rise 443 from the output voltage setpoint 409 to the detection point 445 as shown in the output voltage waveform 405. The operating frequency waveform 433 based on Vsense (i.e., $F_{SW\_TEMP}$) represents the switching frequency of the converter 300 that would typically be generated from the conventional feedback based control loop. At the detection point 445 of the output voltage 405, the controller 307 reduces 447 the operating frequency 433 based on Vsense from the high load frequency 421 associated with the high load condition 415 to the low load frequency 411 associated with the low load steady state 407. As shown in waveform 433, the operating frequency based on Vsense undershoots the standby mode operating frequency 411 and reaches a minimum frequency 449 before settling at the standby mode operating frequency 411.

However, the operating frequency waveform 403 illustrates the actual operating frequency ($F_{SW\_FINAL}$) set by the controller 307 that is used to drive switch Q1 according to the embodiment herein. Once the output voltage rises 443 to the detection point 445, the controller 307 causes the actual operating frequency to track the operating frequency 433 calculated based on Vsense until the actual operating frequency 403 is reduced to the intermediate frequency 429.

As shown in FIG. 4B, like the operating frequency 433 calculated based on $V_{SENSE}$, the actual operating frequency 403 is set at the high load frequency 421 during the high load condition 415. During the time period 451 when the converter 300 is operating at the high load operating frequency 421, the output control signal 309 is outputted at a higher frequency compared to when the converter 300 is operating at the standby mode operating frequency ($F_{SW}$ at No-Load Steady State) 411 and the intermediate frequency 429.

At the detection point 445 of the output voltage, the controller 307 causes the actual operating frequency $F_{SW\_FINAL}$ to initially track the operating frequency calculated based on $V_{SENSE}$. Once the intermediate frequency 429 is reached, at time T0, the controller 307 initiates a timer represented by timer waveform 453. The timer waveform 453 describes the time period (from T0 to T1) in which the actual operating frequency is clamped at the intermediate frequency 429. The length of the timer is related to the power converter system design parameters. The design parameters include the frequency of the repetitive dynamic load changes, the standby mode operating frequency 411, the total system power consumption at the standby condition, the output capacitor C1, the intermediate frequency at which the actual frequency is clamped, and the maximum allowable output voltage overshoot, etc. In one embodiment, the length of the timer is greater than the period of the repetitive load change and can be in the range of 2-5 times the period of the repetitive load change. For example, if the repetitive dynamic load change rate is roughly 100 Hz (i.e., 10 ms period), then the length of the timer may range from 20 ms to 50 ms. Note that the length of the timer may also include enough margin to account for variations in the repetitive dynamic load change rate. During the time period from T0 to T1, note that the frequency of the output control signal is higher than the frequency of the output control signal during the time period 255 described with respect to FIG. 2B. Because of the more frequent switching cycles, the converter 300 can better respond to any subsequent load changes.

Once the timer expires at time T1, the controller 307 disables the frequency clamp. The controller 307 reduces 455 the actual operating frequency ($F_{SW\_FINAL}$) to the operating frequency calculated based on Vsense. As shown in FIG. 4B, after the expiration of the timer 453 at time T1 the actual operating frequency decreases 455 from the intermediate frequency 429 and settles to the standby mode operating frequency 411 associated with the low load steady state condition 407. Note that the frequency of the output control signal 453 after time T1 is less than the frequency of the output control signal between times T0 to T1 because the controller 307 has set the operating frequency to the lower standby mode operating frequency 411. Because the actual operating frequency at the steady-state low load condition 407 is not increased, the no load power consumption is not compromised.

Repetitive Dynamic Load Condition

Figure 5A:
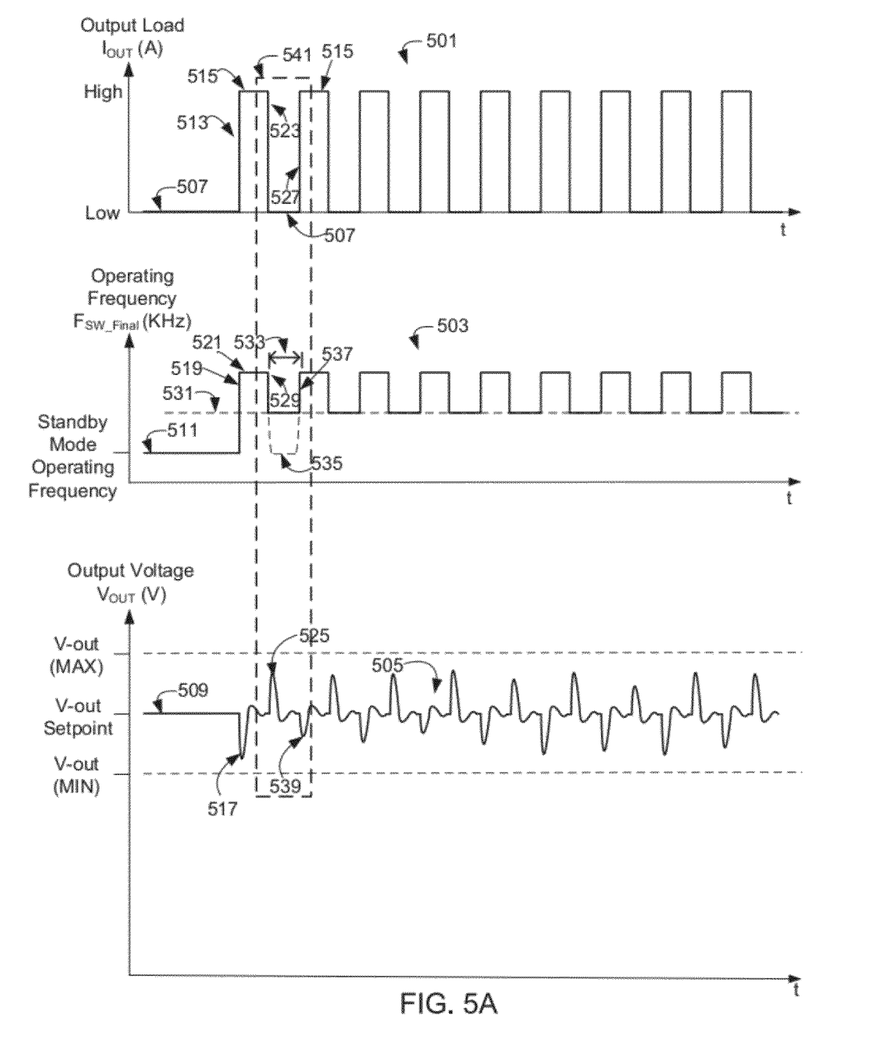
FIG. 5A illustrates waveforms of the switching power converter during repetitive dynamic loads, according to one embodiment.

FIG. 5A illustrates waveforms of the converter 300 during repetitive dynamic output load transitions experienced during the operational mode. The waveforms include the output load ($I_{OUT}$) waveform 501, switching power converter operating frequency ($F_{SW\_FINAL}$) waveform 503, and the output voltage ($V_{OUT}$) waveform 505 of the power converter 300 during the repetitive dynamic output load condition. In one embodiment, the repetitive dynamic load condition describes a high frequency change from low-output load to high-output load and vice versa, typically higher than 100 Hz.

The output load waveform 501 illustrates a repetitive dynamic load characteristic during the operational mode of an electronic device. Specifically, the output load wave form 501 illustrates multiple periods of the output load during the repetitive dynamic load from low load to high load and vice versa. The output voltage waveform 505 illustrates the transient response of the output voltage during the repetitive dynamic load response. Similar to FIG. 4A, the switching power converter 300 is configured to operate within a maximum allowable output voltage (V-out (MAX)) and a minimum allowable output voltage (V-out (MIN)). The operating frequency waveform 503 illustrates the switching frequency of the switching power converter 300 during the repetitive dynamic load response.

When the output load is low 507, the output voltage of the switching power converter 300 is at the output voltage set point (V-out Setpoint) 509. During the low load condition 507, the controller 307 sets the operating frequency of the converter 300 at the standby mode operating frequency 511.

As shown in FIG. 5A, during the transition 513 from the low output load 507 to a high-output load 515, the output voltage waveform 505 drops 517 to a value below the output voltage set point 509 but greater than the minimum output voltage. The output voltage undershoot 517 is indicative of a rise 513 in the output load. In response to the output voltage undershoot 517, the controller 307 increases 519 the operating frequency from the standby mode operating frequency 511 to the high load operating frequency 521 associated with the high load condition 515. Note that because of the repetitive dynamic load, the voltage output 505 never reaches steady state output voltage setpoint 509.

During the transition 523 from the high-output load 515 to the low output load condition 507, the output voltage waveform overshoots 525 the voltage output set point 509. The output voltage overshoot 525 does not exceed the maximum allowable output voltage of the converter 300. The controller 307 reduces 529 the operating frequency until an intermediate frequency 531 is reached in order to reduce the output voltage from the overshoot 525 back to the output voltage setpoint 509. As shown in FIG. 5A, the operating frequency is clamped at the intermediate frequency 531 that is lower than the high load operating frequency 521 and greater than the standby mode operating frequency 511 during the low output load condition. The intermediate frequency 531 is related to the power converter system design parameters. These design parameters include the standby mode operating frequency 511, the total system power consumption at the standby condition, the output capacitor C1, the length of the timer during which the actual operating frequency is clamped at the intermediate frequency 531, the maximum allowable output voltage overshoot, etc. In one embodiment, the intermediate frequency 531 is set in the range of 3 to 8 times the standby mode operating frequency 411. By setting the operating frequency at the intermediate frequency 531, the controller 307 can respond quicker to the subsequent change 527 in load from the low load condition 507 to high load condition 515 compared to when the operating frequency is set based on the value of Vsense as described above with respect to FIG. 2.

Similar to the one-time dynamic load change, the switch controller 307 sets an override period 533 when the transition 523 from the high load 515 to low load condition 507 is detected during the operational mode. Specifically, the controller 307 sets the override period 533 responsive to the reduction 529 of the operating frequency reaching the intermediate frequency 531. In one embodiment, the override period 533 describes a time period in which the switch controller 307 overrides the operating frequency of the converter 300 calculated based on the value of the Vsense signal from the feedback control loop. The operating frequency calculated based on the value of Vsense is illustrated as dashed line 535. Instead of setting the operating frequency 535 of the switching power converter 300 calculated based on Vsense during override period 533, the controller 307 sets the operating frequency to the intermediate frequency 531.

During the override period 533, if the operating frequency 535 calculated based on the value of Vsense is higher than the intermediate frequency 531, the actual operating frequency of the switching converter 300 is set to the operating frequency 535 based on the value of Vsense. However, if the operating frequency 535 calculated based on the value of Vsense is less than or equal to the intermediate frequency 531, the actual operating frequency of the switching converter 300 is clamped to the intermediate frequency 531. Once the override period 533 expires, the switch controller 307 sets the operating frequency 535 based on the feedback signal Vsense.

However, if the power converter 300 experiences a transition 527 from the low load 507 to high load condition 515 prior to the override period 533 expiring, the switch controller 307 increases 537 the operating frequency to respond to the increased load condition. Because the power converter 300 is operating at the intermediate frequency 531 which is a higher frequency than the standby mode frequency 511 based on Vsense, the switching power converter 500 is better able to quickly respond to the transition 527 from the low load 507 to high dynamic load condition 515. The improved response of the converter 300 results in the lower output voltage undershoot 539 compared to the output voltage undershoot 229 illustrated in FIG. 2A.

Figure 5B:
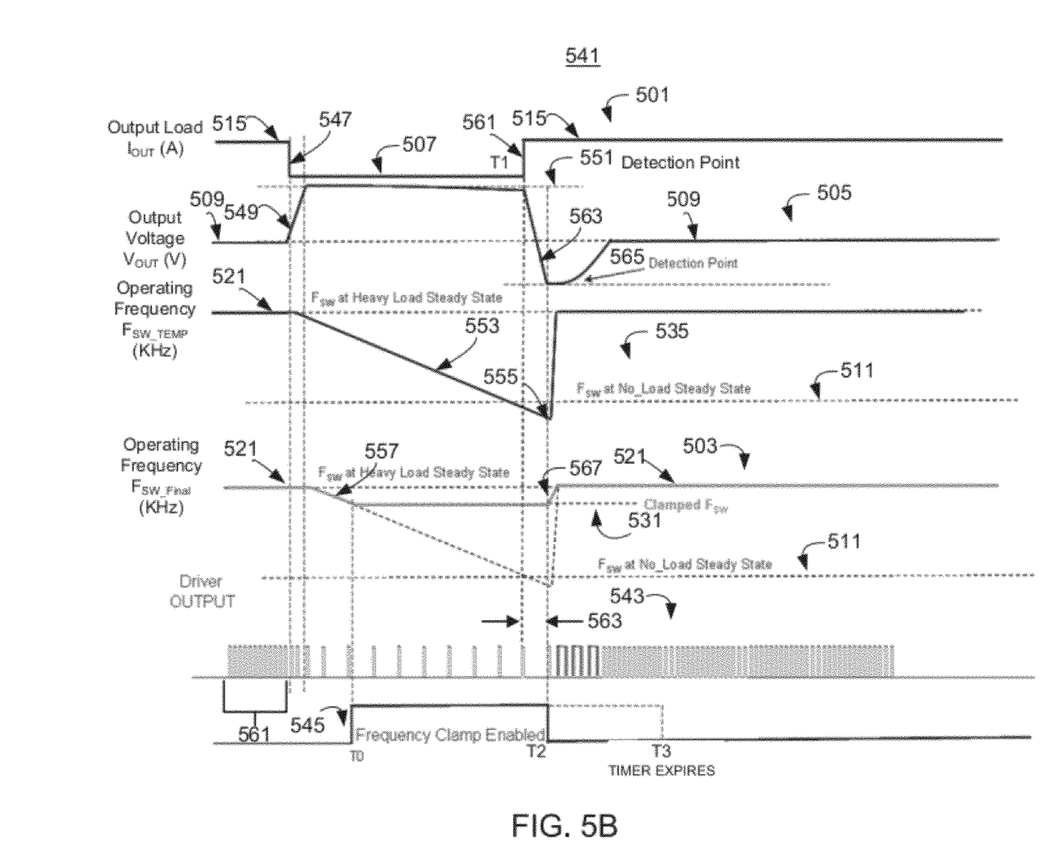
FIG. 5B illustrates a detailed view of the waveforms of the switching power converter during the repetitive dynamic loads, according to one embodiment.

Turning to FIG. 5B, FIG. 5B illustrates a detailed view of portion 541 of the waveforms of the converter 300 in FIG. 5A during the repetitive dynamic load condition. In addition to the output load waveform 501, the actual operating frequency ($F_{SW\_FINAL}$) 503 of the converter 300, and output voltage waveform 505, FIG. 5B also illustrates the operating frequency ($F_{SW\_TEMP}$) waveform 535 calculated based on $V_{SENSE}$, the driver output waveform 543 representative of the output drive signal 309 of the controller 307, and a timer waveform 545 as will be further described below.

The output load waveform 501 illustrates the transition 547 from the high load 515 to low load condition 507 which causes the output voltage to rise 549 from the output voltage setpoint 509 to the detection point 551 as shown in the output voltage waveform 505. The operating frequency waveform 535 calculated based on Vsense (i.e., $F_{SW\_TEMP}$) represents the switching frequency of the converter 300 that would be generated from the conventional feedback based control loop. As the output voltage overshoots 549 to the output voltage detection point 551, the controller 307 reduces 553 the operating frequency calculated based on Vsense from the high load frequency 521 to the standby mode frequency 511 associated with the low load condition 507. Because the controller 307 is unable to distinguish between the repetitive dynamic load change and the one-time dynamic load change, the transition 547 from high load 515 to low load 507 appears as a one-time load change to the controller 307. Accordingly, the controller 307 sets the operating frequency 535 to the standby mode operating frequency 511 associated with the low load condition 507. As shown in waveform 535 the operating frequency based on $V_{SENSE}$ undershoots 555 the standby mode operating frequency 511 during the high load to low load transition 547. Because the operating frequency 535 calculated based on $V_{SENSE}$ is below the standby mode frequency 511, the converter 300 would be unable to quickly respond to the subsequent transition 561 to the high load condition 515 if the actual operating frequency 503 were based on $V_{SENSE}$.

However, operating frequency waveform 503 illustrates the actual operating frequency ($F_{SW\_FINAL}$) set by the controller 307 used to drive switch Q1 according to the embodiments herein. Once the output voltage rises to the output voltage detection point 551, the controller 307 causes the actual operating frequency to initially 557 track the operating frequency 535 calculated based on Vsense. Like the operating frequency calculated based on $V_{SENSE}$, the actual operating frequency 503 is set at the high load frequency 521 during the high load condition 515. During the time period 561 when the converter 300 is operating at the high load operating frequency 521, the output control signal 309 is outputted at a frequency corresponding to the high load operating frequency 521.

Upon the output voltage overshooting to the detection point 551, the actual operating frequency initially tracks 557 the operating frequency calculated based on $V_{SENSE}$. The controller 307 reduces 557 the actual operating frequency $F_{SW\_FINAL}$ until the intermediate frequency 531 is reached. Once the intermediate frequency 531 is reached, at time T0, the controller 307 initiates a timer represented by timer waveform 545 that expires at time T3. The controller 307 also clamps the actual operating frequency to the intermediate frequency 531. The timer waveform 545 describes the time period (T0 to T3) in which the actual operating frequency may be clamped at the intermediate frequency 531 during a low load condition 507. The length of the timer is related to the power converter system design parameters. The design parameters include the frequency of the repetitive dynamic load changes, the standby mode operating frequency 511, the total system power consumption at the standby condition, the output capacitor C1, the intermediate frequency at which the actual frequency is clamped, and the maximum allowable output voltage overshoot, etc. In one embodiment, the length of the timer is greater than the period of the repetitive load change and can be in the range of 2-5 times the period of the repetitive load change. For example, if the repetitive dynamic load change rate is roughly 100 Hz (i.e., 10 ms period), then the length of the timer may range from 20 ms to 50 ms. Note that the length of the timer may also include enough margin to cover variations of repetitive dynamic load change rate. During the time period from T0 to T2, note that the frequency of the output control signal 309 is higher than the frequency of the output control signal 309 during the time period 255 described with respect to FIG. 2B but less than the frequency of the output control signal during time period 561 when the converter 300 is operating at the high load operating frequency 521.

At time T1, (prior to the expiration of the timer at time T3) the output load transitions 561 from low load 507 back to the high output load condition 515 due to the repetitiveness of the output load. During the transition 561, the output voltage undershoots 563 the output voltage setpoint 509. However, during the transition 561, the operating frequency is still clamped at the intermediate frequency 531 which is greater than what the calculated operating frequency would have been set to based on Vsense. The higher operating frequency of the converter 300 allows for a shorter switching period or blank time 563. Because the blank time 563 is much shorter than the blank time 247 illustrated in FIG. 2B, the converter 300 can respond in a quicker manner to load changes during the time period between T0 and T3 compared to if the switching frequency were set to the lower frequency based on Vsense.

For example, because of the higher switching frequency, at the next switching cycle at time T2 prior to the expiration of the timer at T3, the voltage undershoot 563 is detected by the controller 307 at the detection point 565 quicker when compared to the time it would have taken the controller 307 to detect the undershoot 563 if the operating frequency were calculated according to Vsense. The controller 307 then increases 567 the operating frequency to the high load operating frequency 521 so that the output voltage can quickly reach steady state output voltage setpoint 509. Thus, although the timer had not expired at time T3, the controller 307 still increased the operating frequency to account for the change in output load to the high load condition 515. Because the maximum output voltage undershoot 565 is reduced when compared to the deep undershoot 251 of the output voltage in FIG. 2B, the repetitive dynamic load response performance is improved while still achieving ultra-low no load power consumption during the one-time dynamic load condition. After the controller 307 detects the low load to high load transition 561 at time T2, the controller 307 resets the timer in preparation for the next round of repetitive dynamic load responses even though the timer is not set to expire until time T3.

Override Frequency Threshold

Figure 6:
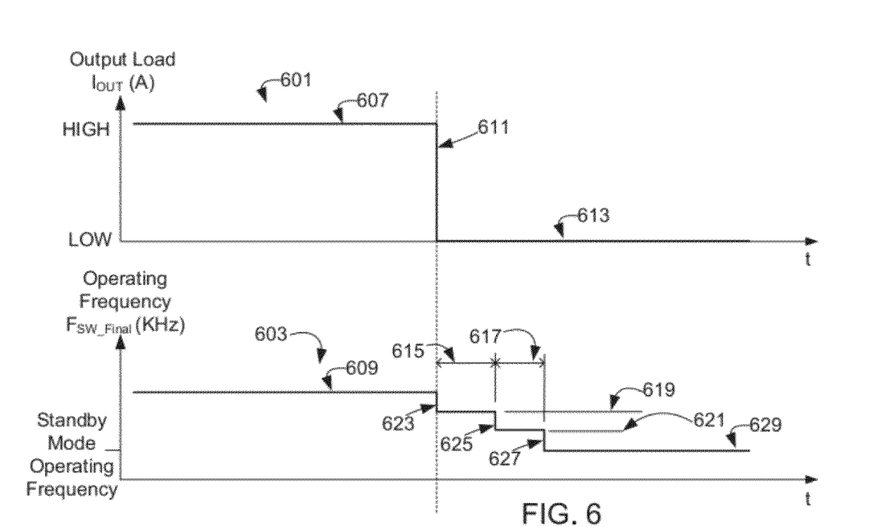
FIG. 6 illustrates waveforms of variable operating frequency characteristics of the switching power converter, according to one embodiment.
Figure 7:
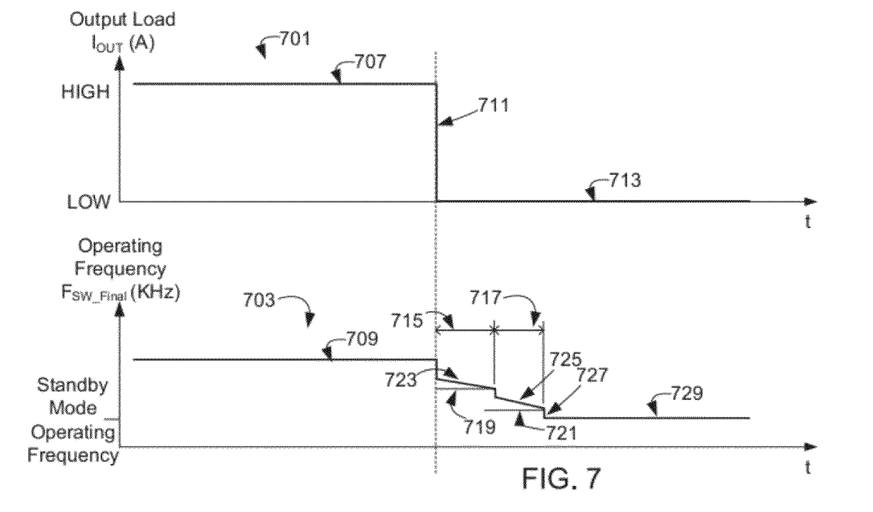
FIG. 7 illustrates waveforms of alternative variable operating frequency characteristics of the switching power converter, according to one embodiment.

FIGS. 6 and 7 illustrate various embodiments of variable override frequency thresholds and timers. The following timers and variable thresholds may be applied to one time dynamic load conditions or the repetitive dynamic load conditions as described above. Note that in other embodiments, other time and threshold configurations may be employed.

Output load waveform 601 illustrates a high to low dynamic load condition and operating frequency waveform 603 illustrates the operating frequency of the converter 300 during the load transition. During the high output load condition 607, the controller 307 sets the operating frequency to the high load operating frequency 609. When the transition 611 from the high load 607 to low dynamic load condition 613 is detected, one or more frequency override timers 615 and 617 are initiated. The duration of each timer may be adaptively set by the controller 307 or may be preset. In one embodiment, the initiation of the timers is set relative to the detection of the transition 611 in the load. Alternatively, the initiation of the timers is set relative to each other as shown in FIG. 6. Each override timer is respectively associated with an intermediate frequency. Particularly, timer 615 is associated with intermediate frequency 619 and timer 617 is associated with intermediate frequency 621.

Upon detection of the transition 611 from high load 607 to the low load 613, timer 615 is initiated which causes the controller 307 to decrease 623 the operating frequency from the high load operating frequency 609 to the intermediate threshold frequency 619. As illustrated in FIG. 6, the operating frequency is decreased 623 in a step increment to the intermediate frequency 619. In one embodiment, the step increment is in the range of 20 percent to 40 percent of the high load operating frequency 609. Once timer 615 expires, timer 617 is initiated which causes the controller 307 to further decrease 625 the operating frequency from the intermediate frequency 619 to the intermediate frequency 621 in another step increment. Once the timer 619 expires, the controller 307 again decreases 627 the operating frequency from the intermediate frequency 621 to the standby mode operating frequency 629.

FIG. 7 illustrates alternative override frequency thresholds and the override periods. Similar to FIG. 6, output load waveform 701 illustrates a high to low dynamic load condition and operating frequency waveform 703 illustrates the operating frequency of the converter 300 during the load transition. During the high output load condition 707, the controller 307 sets the operating frequency to the high load operating frequency 709. When the transition 711 from the high load 707 to low dynamic load condition 713 is detected, one or more frequency override timers 715 and 717 are initiated. The duration of each timer may be adaptively set by the controller 307 or may be preset. In one embodiment, the initiation of the timers is set relative to the detection of the transition 711 in the load. Alternatively, the initiation of the timers is set relative to each other as shown in FIG. 7. Each override timer is respectively associated with an intermediate frequency. Particularly, timer 715 is associated with intermediate frequency 719 and timer 717 is associated with intermediate frequency 721.

Upon detection of the transition 711 from high load 707 to the low load 713, timer 715 is initiated which causes the controller 307 to decrease the operating frequency from the high load operating frequency 709 to the intermediate frequency 719. As illustrated in FIG. 7, the operating frequency is decreased 723 at a linear rate until intermediate frequency 719 is reached. Note that in alternative embodiments, the operating frequency is decreased at a non-linear rate. Once timer 715 expires, timer 717 is initiated which causes the controller 307 to decrease 725 the operating frequency from the intermediate frequency 719 to the intermediate frequency 721 at a linear rate. To decrease the operating frequency, at every step (i.e., the switching cycle) the switching frequency is reduced by the step of 10 percent to 20 percent of the high load operating frequency 709 from the previous switching cycle. Alternatively, the switching frequency of the current switching cycle is reduced to 35 percent to 50 percent of the switching frequency used in the previous switching cycle. Once the timer 717 expires, the controller 307 decreases 727 the operating frequency from the intermediate frequency 721 to the standby mode operating frequency 729.

Upon reading this disclosure, those of skill in the art will appreciate still additional alternative designs for detecting no load conditions in a switching power converter and operating the switching power converter under no load conditions. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A switching power converter comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off; and
a controller configured to generate a control signal to turn on or turn off the switch, the switch being turned on responsive to the control signal being in a first state and the switch being turned off responsive to the control signal being in a second state;
wherein after a transition from a first output load condition to a second output load condition, the controller is further configured to generate the control signal at an intermediate frequency for a period of time during the second output load condition, the intermediate frequency being lower than a first frequency corresponding to the first output load condition but higher than a second frequency corresponding to the second output load condition;
wherein the controller is further configured to generate the control signal at the second frequency corresponding to the second output load condition responsive to the expiration of the period of time.

2. The switching power converter of claim 1, wherein the second output load condition is a no-load condition.

3. The switching power converter of claim 1, wherein the controller is further configured to gradually lower a frequency of the control signal from the first frequency to the intermediate frequency based upon frequencies calculated based upon a feedback signal indicative of the output voltage of the switching power converter.

4. The switching power converter of claim 1, wherein the controller is further configured to generate the control signal at the first frequency during a transition from the second output load condition to the first output load condition prior to the expiration of the period of time.

5. The switching power converter of claim 1, wherein the controller is further configured to gradually lower a frequency of the control signal from the intermediate frequency to the second frequency responsive to the expiration of the period of time.

6. The switching power converter of claim 1, wherein during the second output load condition, the controller is further configured to generate the control signal at another intermediate frequency lower than the intermediate frequency but higher than the second frequency corresponding to the second output load condition after the expiration of the period of time.

7. The switching power converter of claim 6, wherein the controller is further configured to linearly or non-linearly lower a frequency of the control signal from the first frequency to the intermediate frequency and from the intermediate frequency to said another intermediate frequency.

8. The switching power converter of claim 6, wherein the controller is further configured to lower a frequency of the control signal from the first frequency to the intermediate frequency in a first step and from the intermediate frequency to said another intermediate frequency in a second step.

9. In a controller, a method of controlling a switching power converter, the switching power converter including a transformer with a primary winding coupled to an input voltage and a secondary winding coupled to an output of the switching power converter, and a switch coupled to the primary winding of the transformer, current through the primary winding being generated while the switch is turned on and not being generated while the switch is turned off, the method comprising:
generating a control signal to turn on or turn off the switch, the switch being turned on responsive to the control signal being in a first state and the switch being turned off responsive to the control signal being in a second state; and
generating the control signal at an intermediate frequency lower than a first frequency corresponding to a first output load condition but higher than a second frequency corresponding to a second output load condition for a period of time after a transition from the first output load condition to the second output load condition; and
generating the control signal at the second frequency corresponding to the second output load condition responsive to the expiration of the period of time.

10. The method of claim 9, wherein the second output load condition is a no-load condition.

11. The method of claim 9, further comprising:
gradually lowering a frequency of the control signal from the first frequency to the intermediate frequency based upon frequencies calculated based upon a feedback signal indicative of the output voltage of the switching power converter.

12. The method of claim 9, further comprising:
generating the control signal at the first frequency during a transition from the second output load condition to the first output load condition prior to the expiration of the period of time.

13. The method of claim 9, further comprising:
gradually lowering a frequency of the control signal from the intermediate frequency to the second frequency responsive to the expiration of the period of time.

14. The method of claim 9, further comprising:
generating the control signal at another intermediate frequency lower than the intermediate frequency but higher than the second frequency corresponding to the second output load condition after expiration of the period of time, the generation of the control signal during the the second output load condition.

15. The method of claim 14, further comprising:
linearly lowering a frequency of the control signal from the first frequency to the intermediate frequency and from the intermediate frequency to said another intermediate frequency.

16. The method of claim 14, further comprising:
lowering a frequency of the control signal from the first frequency to the intermediate frequency in a first step and from the first intermediate frequency to said another intermediate frequency in a second step.

* * * * *